J. ZIELISKO.
VEHICLE WHEEL.
APPLICATION FILED OCT. 5, 1918.

1,327,849.

Patented Jan. 13, 1920.
2 SHEETS—SHEET 1.

INVENTOR
John Zielisko.
BY Oscar Geill
his ATTORNEY

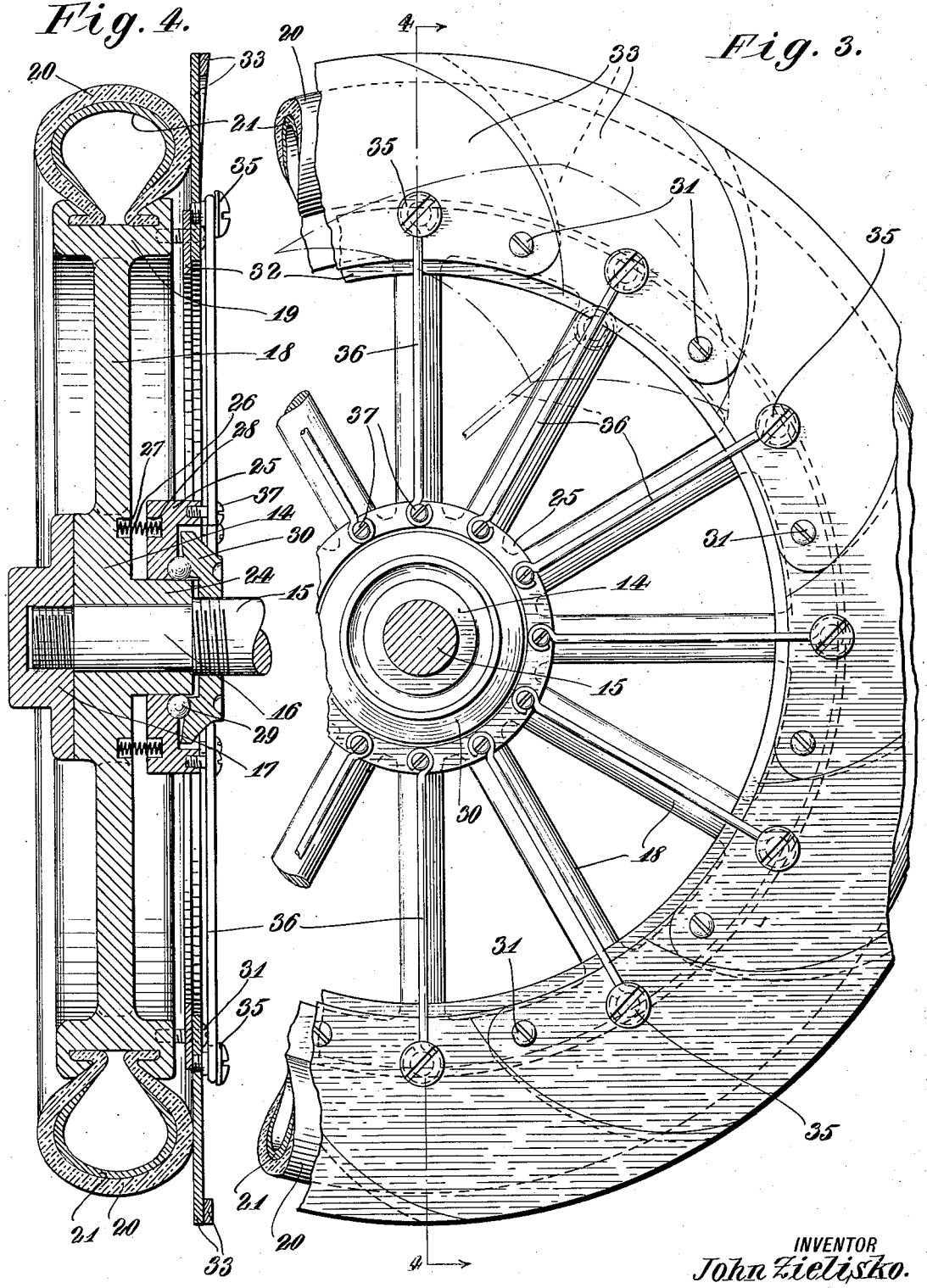

UNITED STATES PATENT OFFICE.

JOHN ZIELISKO, OF SNIATYN, ALBERTA, CANADA.

VEHICLE-WHEEL.

1,327,849.　　　　　Specification of Letters Patent.　　Patented Jan. 13, 1920.

Application filed October 5, 1918. Serial No. 256,976.

*To all whom it may concern:*

Be it known that I, JOHN ZIELISKO, a subject of the King of England, residing at Sniatyn, Province of Alberta, and Dominion of Canada, have invented certain new and useful Improvements in Vehicle-Wheels, of which the following is a specification.

This invention relates to improvements in wheels, and particularly to types adapted to be applied to vehicles of the better grade, and has as its special object the provision of means whereby a vehicle having pneumatic or cushion tread wheels, may be quickly and easily arranged to traverse over the tracks of railways by means of extending lateral flanges adjustably secured to the sides of the wheels.

A further object is to provide means whereby the flanges, which are made in segments, may be extended or retracted in an easy and efficient manner and in a moment's time.

These and other like objects are attained by the novel construction and combination of parts hereinafter described and shown in the accompanying drawing, forming a material part of this disclosure, and in which:—

Fig. 3 is a fragmentary side elevational view, showing a wheel made in accordance with the invention, and Fig. 4 is a vertical sectional view, taken on line 4—4 of Fig. 3.

Figure 1:
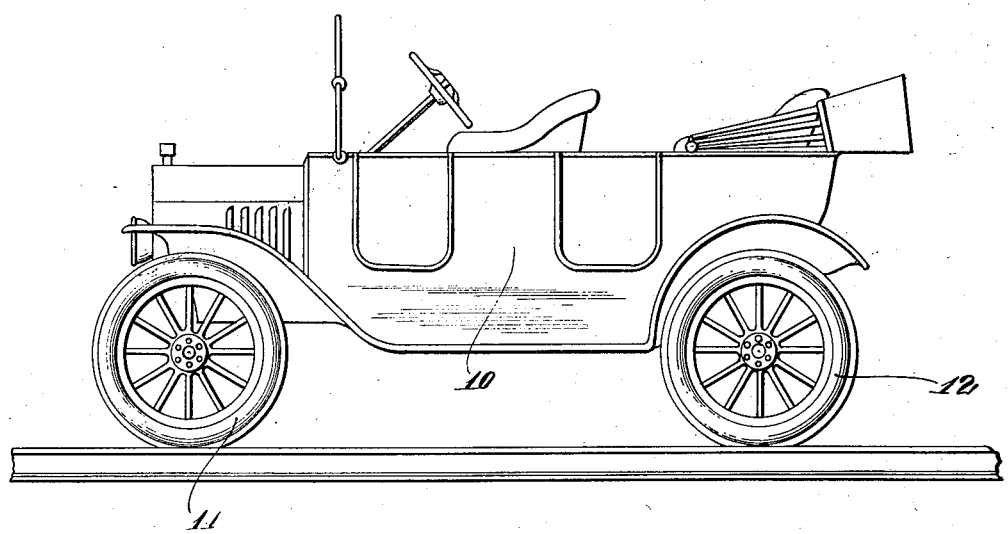
Figure 1 is a side elevational view, showing a conventional type of automobile and indicating the application of the invention.
Figure 2:
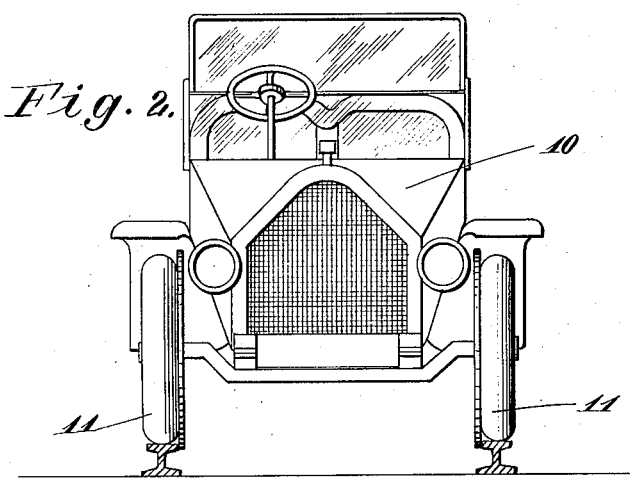
Fig. 2 is a front elevational view of the same, showing the wheel resting upon a track-way.

While obviously the type of wheel may be applied to any style of vehicle whatever, the wheels shown are applied to an automobile designated by the numeral 10, the same having all of the usual appurtenances and apparatus as are commonly provided.

These wheels 11 and 12, respectively front and rear are arranged upon axles in the usual manner, the wheels consisting of a hub 14, secured upon an axle 15, the extending ends 16 of which are screw-threaded for the clamp nut 17.

Radiating from the hub 14 are spokes 18 fixed at their outer ends within a rim 19, arranged to secure the tread shoe 20 containing an inflatable tube 21.

Secured upon the inner extending annular extension 24 of the hub 14, is a rotatable collar-like element 25 pressed away from the hub by the coiled compression springs 26, a plurality of which are used, the same being inserted in openings formed appropriately in the hub 14, while the outer ends are engaged in an annular recess 28, formed in the side of the collar 25, the outer face of which is formed with an annular seat retaining the balls 29, held in operative position by a cap 30, screw-threaded to a portion of the axle 15.

Permanently secured to the inner side of the rim 19 is a flat washer-like ring 32 upon which are pivoted by the screws 31, a plurality of segmental plates 33, arranged in overlapping relation with respect to their contacting edges and adapted, when extended, to form a substantially unbroken peripheral edge extending outward and having a diameter exceeding that of the tread 20.

Engaged in the outer surface of the plates 33 are shoulder screws 35 to which are engaged the outer ends of rods 36, pivotally connected at their inner ends, by screws 37, with the collar 25, the construction being such that as the collar 25 is rotated upon the hub 14, to cause all of the several segmental plates 33 to pivot on the screws 31, folding into the position shown in the dotted line in Fig. 3, thereby collapsing the guard elements 33 so that the wheel may be used in the ordinary manner upon any level surface.

Obviously, if it is desired to cause the vehicle to move over a railway track, the collar 25 is rotated in an opposite direction, causing the rods 36 to resume their normal radial position, parallel with the spokes 18, and press the guard plates 33 outwardly, as shown in the full line in Figs. 3 and 4.

From the foregoing it will be seen that means have been disclosed whereby an ordinary vehicle wheel may be transformed into one suitable to be used in connection with a railway track, and that the transformation may be accomplished in a simple manner without the use of tools in a fraction of time, and it will be understood the function of the springs 26 is to hold the collar 25 separated from the hub in either of its adjusted positions while the wheel is resting on the road bed or railway track. It will be clear that the wheel during the operation of the collar 25 in either direction must be somewhat raised or jacked up in order to participate in the rotation of the hub for the purpose of preventing the spring 26 from leaving its casing 27 or bending. The springs 26 rest loosely in the recesses of the hub and collar, so that they are not influenced or twisted by the rotation of the collar but merely tend to press the collar away from the hub.

Having thus described my invention what I claim as new and desire to secure by Letters Patent is.

In a vehicle wheel adapted to be used upon a railway track or upon a level surface, the combination with the axle of said vehicle and the wheels thereof, said wheels each comprising a hub, rim and tread, of a collar rotatably mounted on the hub of said wheel, an annular bearing having one of its elements formed in said collar and the other element secured to the axle, frictional means for maintaining said collar when in an adjusted position, a rigid ring formed from a flat annular plate firmly secured to one side of the rim of said wheel, a plurality of segmental plates having arcuate edges pivoted at one of their corners to said fixed ring so as to swing thereon, said plates being adapted to extend beyond the tread of said vehicle wheel or be retracted so as to present a lesser diameter, and rods pivotally secured to said plates at one end and to said collar at the other end, whereby the action of said plates may be controlled.

In testimony whereof I have affixed my signature.

JOHN ZIELISKO.